United States Patent
Zenner et al.

(10) Patent No.: US 10,906,377 B2
(45) Date of Patent: Feb. 2, 2021

(54) SYSTEM AND METHOD FOR HEATING PASSENGER CABIN WITH INVERTER WASTE HEAT BOOSTED BY A HEATER

(71) Applicant: Ford Global Technologies, LLC, Dearborn, MI (US)

(72) Inventors: Thomas Zenner, Dueren (DE); Daniel Benjamin Kok, Ann Arbor, MI (US); Kenneth J. Jackson, Dearborn, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 15/874,936

(22) Filed: Jan. 19, 2018

(65) Prior Publication Data

US 2019/0225052 A1 Jul. 25, 2019

(51) Int. Cl.
*B60H 1/14* (2006.01)
*B60H 1/00* (2006.01)
*B60H 1/22* (2006.01)

(52) U.S. Cl.
CPC ......... *B60H 1/143* (2013.01); *B60H 1/00271* (2013.01); *B60H 1/00328* (2013.01); *B60H 1/00392* (2013.01); *B60H 1/00835* (2013.01); *B60H 1/2225* (2013.01); *B60H 2001/00307* (2013.01); *B60H 2001/2237* (2013.01)

(58) Field of Classification Search
USPC .............................................. 237/5
See application file for complete search history.

(56) References Cited

U.S. PATENT DOCUMENTS

| 6,786,060 B2 * | 9/2004 | Alber ................. B60H 1/00057 165/42 |
| 9,309,982 B2 | 4/2016 | Akiyama et al. |
| 2012/0225341 A1 * | 9/2012 | Major ................ B60H 1/00278 429/120 |
| 2013/0319029 A1 | 12/2013 | Sekiya et al. |
| 2015/0217622 A1 * | 8/2015 | Enomoto ................ B60L 1/003 165/42 |

FOREIGN PATENT DOCUMENTS

| DE | 102014117950 A1 | 6/2016 |
| WO | 2013045089 A1 | 4/2013 |

* cited by examiner

*Primary Examiner* — Steven B McAllister
*Assistant Examiner* — John E Bargero
(74) *Attorney, Agent, or Firm* — David B. Kelley; Brooks Kushman P.C.

(57) ABSTRACT

A vehicle includes an inverter, a climate control system, and a coolant system. The climate control system includes a housing, and a heater core and an electric heater disposed within the housing. The coolant system includes conduit arranged to circulate coolant through the inverter and heater core. The inverter is disposed upstream of the heater core.

5 Claims, 8 Drawing Sheets

SYSTEM AND METHOD FOR HEATING PASSENGER CABIN WITH INVERTER WASTE HEAT BOOSTED BY A HEATER

TECHNICAL FIELD

The present disclosure relates to hybrid-electric and fully electric vehicles that have a climate control system arranged to heat a passenger cabin using heat generated by an inverter in combination with a heat booster.

BACKGROUND

Traditional vehicles powered by an internal-combustion engine typically heat a passenger cabin of the vehicle using waste heat generated by the engine. Coolant heated by the engine is circulated to a heater core disposed within a heating ventilation and air conditioning (HVAC) unit. The HVAC unit includes a blower that circulates an airstream through the heater core and into the passenger cabin to provide heat.

To improve fuel economy and diminish environmental impact, electric and hybrid electric vehicles have been developed to improve fuel economy and reduce pollution. These vehicles may generate none or insufficient engine waste heat to meet cabin-heating requirements. Consequently, other sources of heat are needed to sufficiently heat the cabin.

SUMMARY

According to one embodiment, a vehicle includes an inverter, an electric heater, and a heater core. A vehicle coolant system has conduit arranged to circulate coolant through the inverter, the electric heater, and the heater core such that the electric heater is downstream of the inverter and upstream of the heater core.

According to another embodiment, a vehicle includes an inverter, a climate control system, and a coolant system. The climate control system includes a housing, and a heater core and an electric heater disposed within the housing. The coolant system includes conduit arranged to circulate coolant through the inverter and the heater core. The inverter is disposed upstream of the heater core.

According to yet another embodiment, a method of heating a passenger cabin with a coolant system including an inverter, an electric heater, and a heater core is presented. The method includes operating an inverter to generate heat and circulating coolant through the inverter to transfer heat from the inverter to the coolant. The method further includes boosting a temperature of the coolant with an electric heater and circulating the coolant from the electric heater to the heater core. The method also includes heating an airstream bound for the passenger cabin by circulating the airstream through the heater core.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
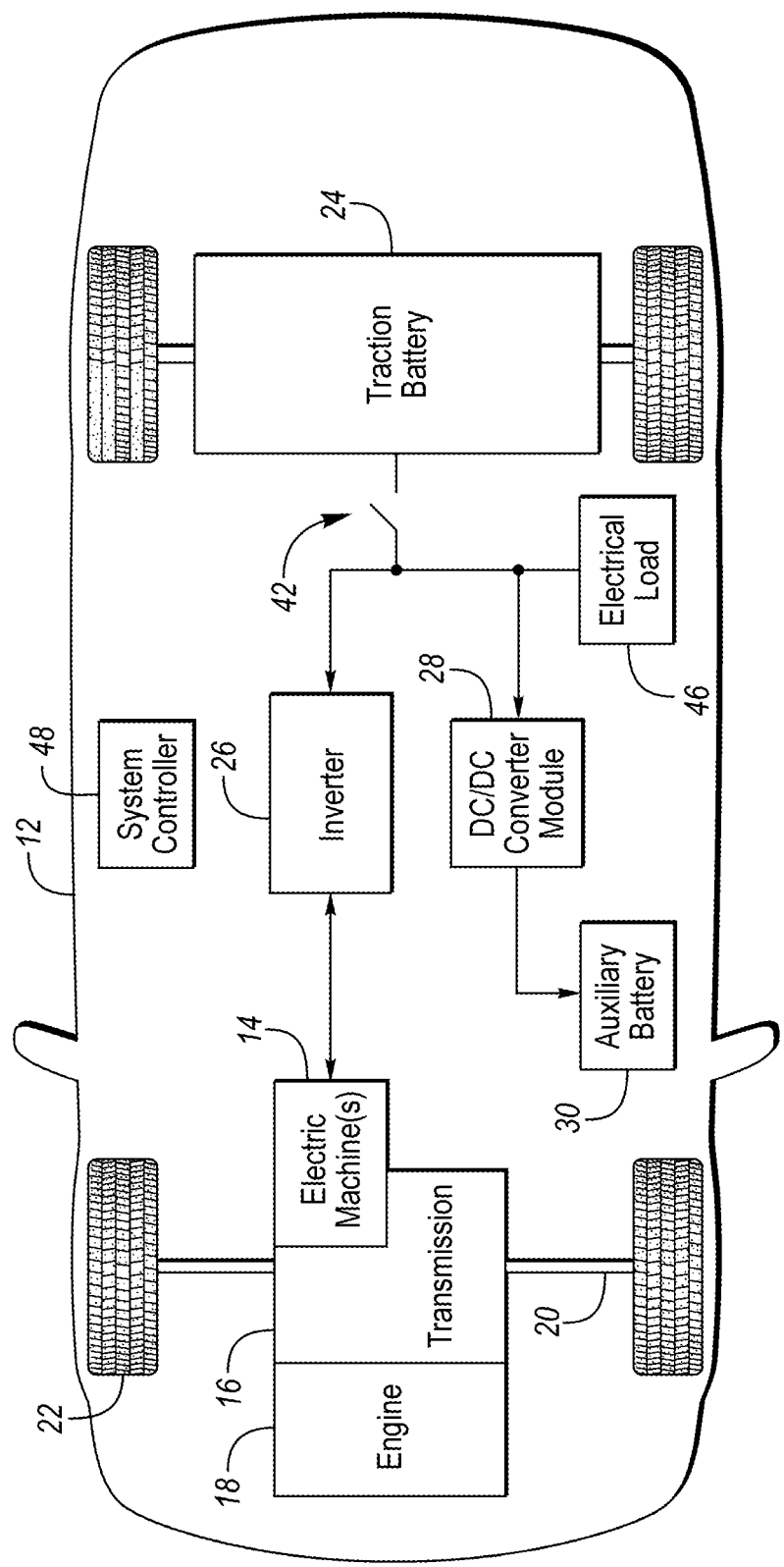
FIG. 1 is a schematic diagram of a hybrid-electric vehicle.

FIG. 1 depicts a hybrid-electric vehicle (HEV) 12, but this disclosure is not limited to an HEV. The vehicle 12 may include one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is mechanically coupled to a driveshaft 20 that is mechanically coupled to the wheels 22. The electric machines 14 can provide propulsion and deceleration capability when the engine 18 is turned ON or OFF. The electric machines 14 also act as generators and can provide fuel economy benefits by recovering energy that would normally be lost as heat in friction braking. The electric machines 14 may also reduce vehicle emissions by allowing the engine 18 to operate at more efficient speeds and allowing the hybrid-electric vehicle 12 to be operated in electric mode with the engine 18 OFF under certain conditions.

A traction battery or battery pack 24 stores energy that can be used by the electric machines 14. The vehicle battery 24 typically provides a high-voltage direct current (DC) output. The traction battery 24 is electrically coupled to an inverter 26. One or more contactors 42 may isolate the traction battery 24 from other components when opened and connect the traction battery 24 to other components when closed. The inverter 26 is also electrically coupled to the electric machines 14 and provides the ability to bi-directionally transfer energy between the traction battery 24 and the electric machines 14. For example, a traction battery 24 may provide a DC voltage while the electric machines 14 may operate with three-phase alternating current (AC). The inverter 26 may convert the DC to three-phase AC to operate the electric machines 14. In a regenerative mode, the inverter acts as a rectifier to convert the three-phase AC from the electric machines 14 acting as generators to the DC compatible with the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12 volt battery). The low-voltage systems may be electrically coupled to the auxiliary battery. Other high-voltage loads 46, such as a compressor, may be coupled to the high-voltage output of the traction battery 24.

One or more electrical loads 46 may be coupled to the high-voltage bus. The electrical loads 46 may have an associated controller that operates and controls the electrical loads 46 when appropriate. Examples of electrical loads 46 may be a heating system or an air-conditioning system.

Electronic systems in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete wires. The vehicle network may include any hardware and software components that aid in transferring signals and data between modules. The vehicle network is not shown in FIG. 1 but the vehicle network may connect to any electronic module that is present in the vehicle 12. A vehicle system controller (VSC) 48 may be present to coordinate the operation of the various components.

The inverter 26, the DC/DC converter 28, and other components generate heat during operation of the electric powertrain. This heat generation may occur when the vehicle is utilizing the electric machines 14 to propel the vehicle and when the battery is being charged either through regenerative braking or by a charge port if equipped. The heat generating components of the electric powertrain, such as the inverter 26 and the DC/DC converter 28, may require one or more thermal management systems to maintain the components within a desired temperature window. Typically, the waste heat generated by the components is dissipated to the outside air and is not utilized for heating the cabin. This disclosure presents a plurality of climate control systems arranged to utilize waste heat from the inverter 26 and the DC/DC converter 28 to heat a passenger cabin of the vehicle 12.

Unlike an internal-combustion engine, which generates sufficient waste heat to warm the cabin, the inverter 28 and the DC/DC converter 28 may not produce enough waste heat to warm the cabin without the aid of a heat booster. The heat booster may increase the temperature of the working fluid circulating through the heater core so that the cabin can be fully heated, or may increase the temperature of an airstream within the heating ventilation and air conditioning (HVAC) unit.

FIGS. 2 through 6 disclose example embodiments of thermal management systems that heat the passenger cabin using waste heat of at least the inverter 26 in combination with a heat booster.

Figure 2:
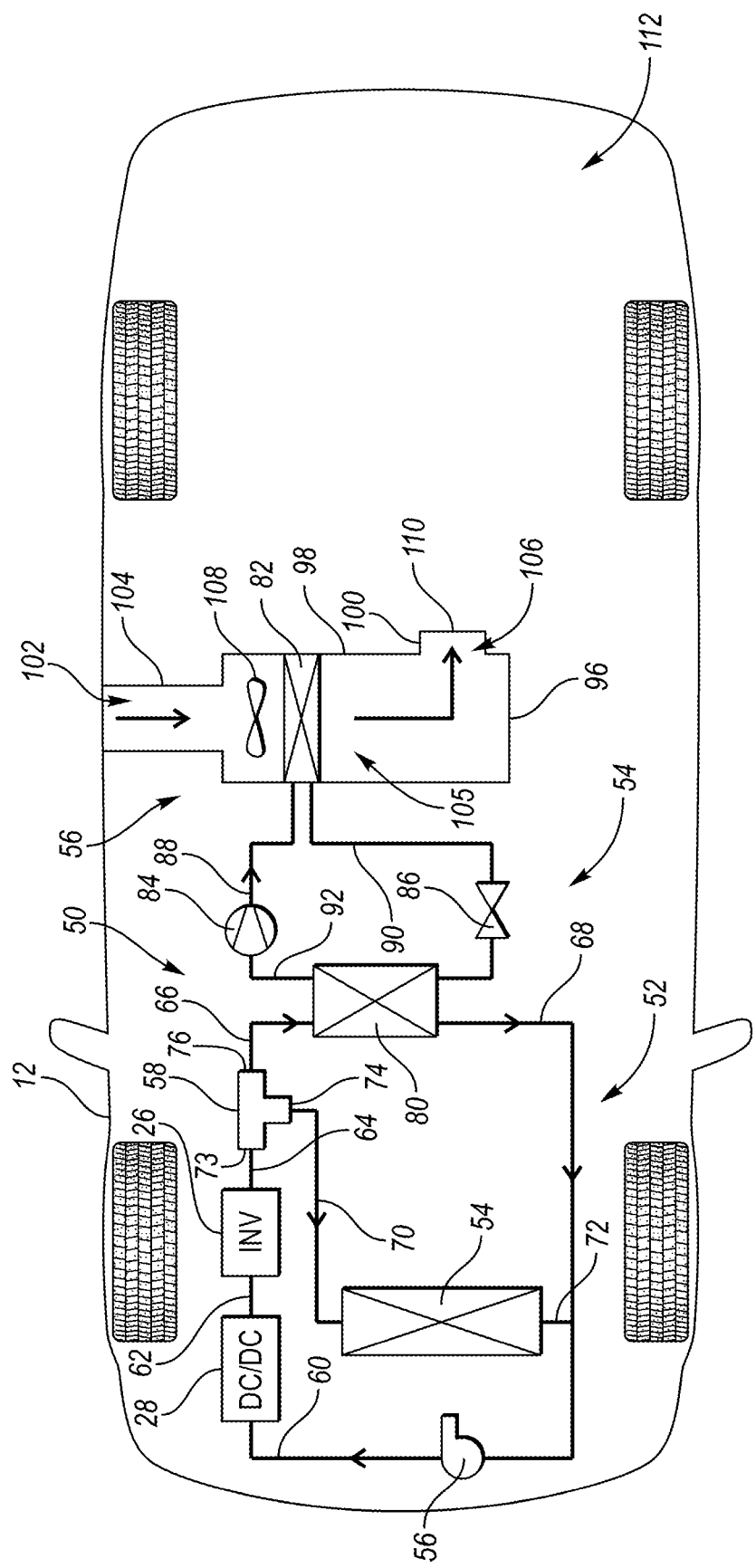
FIG. 2 is a schematic diagram of a thermal management system having a coolant system and a refrigerant system that cooperate to heat a passenger cabin of the vehicle.

Referring to FIG. 2, a thermal management system 50 includes a coolant system 52, a refrigerant system 55 (heat booster), and a climate control system 57. The coolant system 52 is configured to thermally regulate the inverter 26 and the DC/DC converter 28 and to provide waste heat to the climate control system 57 by circulating coolant. Used herein, "coolant" refers to a liquid coolant such as ethylene glycol, other type of anti-freeze, or other suitable liquid. The coolant system 52 may include a radiator 54, a pump 56, a valve 58, and conduit arranged to circulate the coolant through the inverter 26, the DC/DC converter 28, the radiator 54, and other components of the system 50. The coolant system 52 is also arranged to circulate coolant through a liquid-to-refrigerant heat exchanger (evaporator) 80 of the refrigerant system 55 to thermally connect the coolant system 52 and the refrigerant system 55. Liquid-to-refrigerant evaporators are sometimes called chillers.

The coolant system 52 may begin at the pump 56 which is connected to the DC/DC converter 28 by a first conduit 60. The DC/DC converter 28 is connected to the inverter 26 by conduit 62. The valve 58 is located downstream of the inverter 26. The valve 58 may be a three-way valve that includes an inlet 73 connected to the inverter 26 by conduit 64, a first outlet 76 connected with conduit 66, and a second outlet 74 connected to the radiator 54 by conduit 70. The conduit 66 conveys coolant from the three-way valve 58 to the evaporator 80, and conduit 68 returns to the pump 56. An exit side of the radiator 54 is connected to the conduit 68 by conduit 72. The conduit 70 and 72 may be referred to as a radiator loop and the conduit 66 and 68 may be referred to as the evaporator loop.

The valve 58 may be electronically controlled and include a mechanism actuatable to proportion coolant between the outlets 74 and 76. The valve 58 may include a first position in which all of the coolant is circulated to the outlet 76 and a second position in which all of the coolant is circulated to the outlet 74. The valve 58 may further include intermediate positions in which coolant flow is proportioned between the outlets, e.g., the outlet 74 receives 30% of the coolant flow and the outlet 76 receives 70% of the coolant flow. The valve 58 may include an actuator such as a motor that is in electronic communication with the controller 48 and operates according to instructions from the controller 48. In an alternative embodiment, the three-way valve 58 may be replaced with a pair of valves, which may be on-off valves as opposed to the above-described proportioning valve. The pump 56 may also be in electronic communication with the controller 48 and operate according to instructions from the controller 48.

The refrigerant system 55, which may be referred to as a heat pump, may be a vapor-compression system that circulates refrigerant between the evaporator 80 and a refrigerant-to-air heat exchanger (condenser) 82 to move heat from evaporator 80 to the condenser 82. The condenser 82 may be referred to as a heater core as it provides heat to the climate control system 57. The refrigerant system 55 is powered by a compressor 84 connected to the condenser 82 by conduit 88. The condenser 82 is connected to the evaporator 80 by conduit 90. An expansion device 86 is located on the conduit 90 upstream of the evaporator 80. The expansion device 86 may be an actuatable expansion device that has a series of positions including wide-open, closed, and throttled, or may be a passive expansion device such as an orifice tube. The expansion device 86 lowers the temperature and pressure of the refrigerant prior to entering the evaporator 80. The evaporator 80 is connected to the compressor 84 by conduit 92. The refrigerant system 55 may include other known components that will not be discussed, e.g., an accumulator.

The climate control system 57 is responsible for heating and/or cooling a passenger cabin 112 of the vehicle. The climate control system 57 may include an HVAC unit 96 that is typically located under a dash of the vehicle. The HVAC unit 96 includes a housing 98 having an interior 100 with one or more air passages or chambers 104 and 105 that are in fluid communication with each other. The air passage 104 includes a fresh-air inlet 102 that allows fresh air from outside the vehicle to be drawn into the HVAC unit 96. While not shown, the unit 96 may include a recirculated air vent that draws air from inside the cabin 112. An air duct 106 extends from the middle air passage 105 to at least one cabin vent 110 that releases a conditioned airstream into the passenger cabin 112. The condenser 82 is disposed within the passage 105. A blower 108 is arranged to circulate a fresh airstream through the condenser 82 to heat the fresh airstream prior to entering the cabin 112. While not illustrated, the HVAC unit 96 may include one or more valves, e.g., blend doors, actuatable to control a temperature of the airstream exiting the cabin vent 110 and to control air delivery to the at least one air vents. An evaporator (not shown) of an air-conditioning system may be disposed within the housing 98 in some embodiments. Alternatively, the air-conditioning system may have a dedicated HVAC unit. One or more temperature sensors (not shown) may be disposed within the HVAC unit 96 and in communication with the controller. Signals from the temperature sensor may be used to control the thermal management system 50.

The thermal management system 50 may be operated in a plurality of modes such as a cabin-heating mode and a cabin-off mode. During these modes, the inverter 26 and the DC/DC converter 28 may be cooled by the radiator 54 (cabin-off mode), the evaporator 80 (cabin-heating mode), or a combination of both depending upon the embodiment.

According to one embodiment, the valve 58 is actuated to the first position when in the cabin-heating mode so that heat from the inverter 26 and/or the DC/DC converter 28 are circulated to the evaporator 80 rather than the radiator 54. The pump 56 is energized to circulate warm coolant from the inverter 26 and the DC/DC converter 28 to the evaporator 80. The evaporator 80 transfers thermal energy from the coolant to the refrigerant to cool the coolant for recirculation to the inverter 26 and the DC/DC converter 28 while simultaneously warming the refrigerant to provide heat into the refrigerant system 55. The compressor 84 is energized to circulate a highly compressed, hot vapor refrigerant to the condenser 82. The blower 108 is energized to draw the outside airstream through the condenser to heat the airstream delivered to the cabin. Parameters of the refrigerant system, such as compressor power and speed, and speed of the blower 108 can be varied to increase or decrease the temperature of the airstream.

When in cabin-off mode, the valve 58 is actuated to the second position to cool the DC/DC converter 28 and the inverter 26 with the radiator 54. When the valve 58 is in the second position, coolant is circulated to the radiator loop to bypass the evaporator 80. The refrigerant system 55 may not be utilized during cabin-off mode and may be deenergized.

Figure 3:
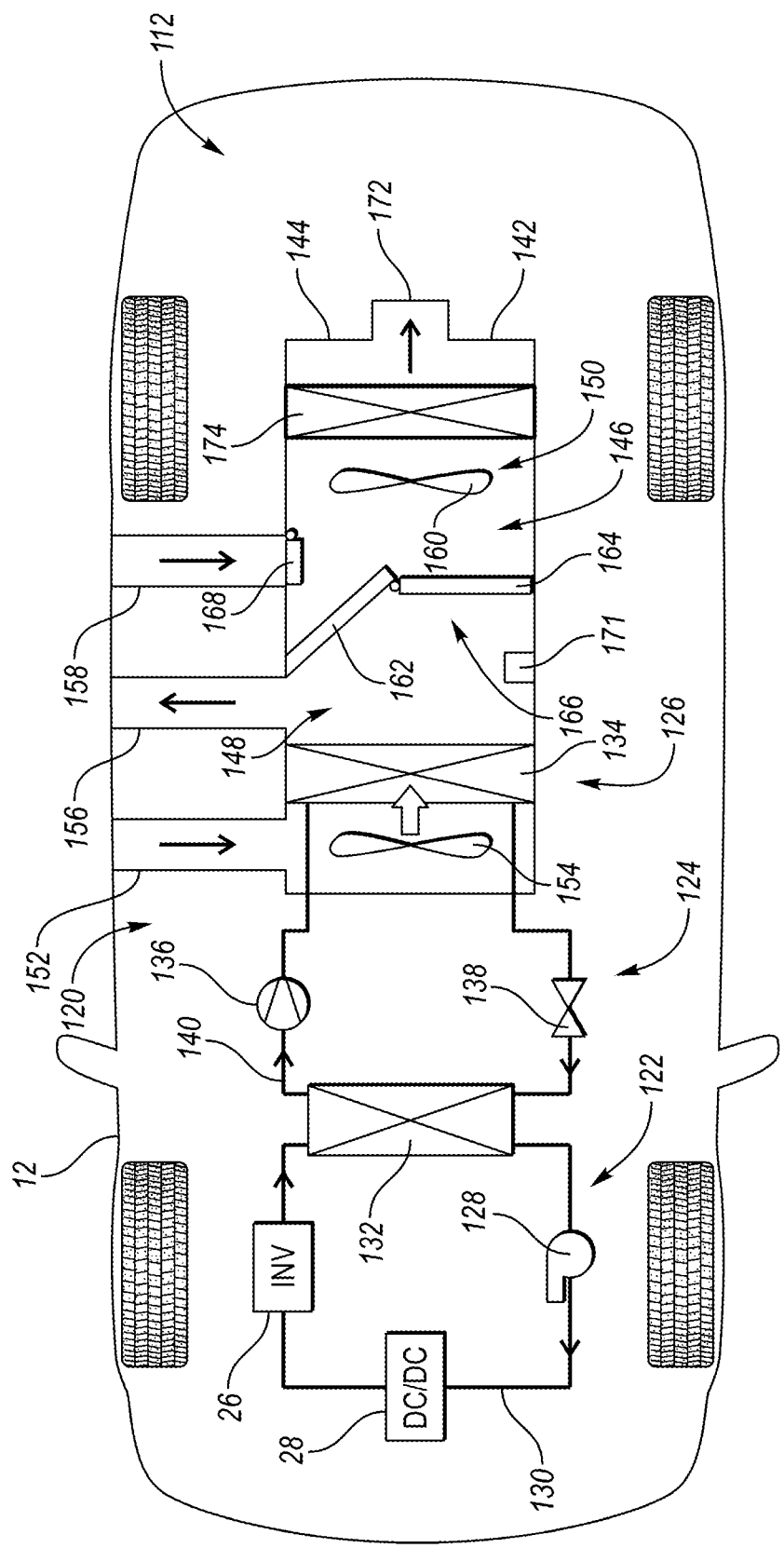
FIG. 3 is a schematic diagram of another thermal management system having a coolant system and a refrigerant system that cooperate to heat a passenger cabin of the vehicle.

Referring to FIG. 3, a thermal management system 120 includes a coolant system 122, a refrigerant system 124 (heat booster), and a climate control system 126. The coolant system 122 is configured to thermally regulate the inverter 26 and the DC/DC converter 28 and to provide waste heat to the climate control system 126 by circulating coolant. The coolant system 122 may include a pump 128 and conduit 130 arranged to circulate the coolant through the inverter 26, the DC/DC converter 28, and other components of the system 122. The coolant system 122 is also arranged to circulate coolant through a liquid-to-refrigerant heat exchanger (evaporator) 132 of the refrigerant system 124 to thermally connect the coolant system 122 and the refrigerant system 124.

The refrigerant system 124 circulates refrigerant between the evaporator 132 and a refrigerant-to-air heat exchanger (condenser) 134 to move heat from evaporator 132 to the condenser 134. The refrigerant system 124 is powered by a compressor 136 that circulates the refrigerant through conduit 140 and the other components of the system 124. An expansion device 138 is located upstream of the evaporator 132.

The climate control system 126 is responsible for heating and/or cooling the passenger cabin 112 of the vehicle 12. The climate control system 126 may include an HVAC unit 142 that is typically located under a dash of the vehicle. The HVAC unit 142 includes a housing 144 having an interior 146 with one or more chambers or passages that are in fluid communication with each other.

Unlike FIG. 2, the coolant system 122 does not include a radiator loop for dissipating heat of the inverter 26 and the DC/DC converter 28. Instead, the inverter 26 and the DC/DC converter 28 are cooled by rejecting waste heat to the HVAC unit 142, i.e., by circulating an airstream through the condenser 134. The interior 146 may be split into a first portion associated with transferring waste heat from the inverter 26 and the DC/DC converter 28, and a second portion associated with thermally regulating the cabin 112. The first and second portions are selectively in fluid communication, and the first portion is upstream of the second portion. The first portion may include a first chamber 148. The condenser 134 of the refrigerant system 124 may be disposed within the first chamber 148. A first blower 154 is also disposed in the first chamber 148 upstream of the condenser 134 and draws a fresh-air airstream through the first fresh air inlet 152 to circulate the airstream through the condenser 134. The heated air may be circulated to an exterior vent 156, to the second portion, or a combination of both depending upon heating needs of the cabin 112.

The second portion may include a second chamber or passage 150 that is separated from the first air chamber 148 by a dividing wall 162. An air passageway or opening 166 extends through the dividing wall 162 to connect the first chamber 148 and the second chamber 150 in fluid communication. A valve 164 opens and closes the passageway 166. In the illustrated embodiment, the valve 164 is a blend door that is pivotally attached to the wall 162. When the blend door is in a first position (shown solid) the passageway 166 is completely blocked routing the airstream to the exterior vent 156. The first position corresponds to a non-heating mode of the cabin 112. When the blend door is in a second position (shown in phantom), the vent 156 is completely closed routing the heated airstream into the second chamber 150 and subsequently into the cabin 112 via at least one cabin vent 172.

The second chamber 150 may be in fluid communication with a second fresh air inlet 158 so that the temperature of the airstream can be controlled. A second valve 168, such as a blend door, controls the flow of fresh air into the chamber 150. When the valve 168 is in a first position (shown), fresh air is not drawn into the chamber 150 and fully heated air is circulated to the cabin. The valve 168 may be opened to a series of positions that introduce various amounts of fresh air to reduce the temperature of the airstream as desired.

A second blower 160 may be disposed in the chamber 150. The second blower 160 may be used in conjunction with the first blower 154 to boost circulation of air into the passenger cabin 112. The first and second blowers 154, 160 may also be used independently of each other when the valve 164 is closed to isolate the chamber 148 from the chamber 150. When the valve is closed, the blower 160 may circulate unheated air from the second fresh air inlet 158 into the cabin 112. In some embodiments, the evaporator 174 of the vehicle air-conditioning system may be housed in the second chamber 150. Here, the blower 160 circulates an airstream through the evaporator 174 to condition the air for the passenger cabin 112. In other embodiments, the vehicle air-conditioning system may have a dedicated HVAC unit, in which case the evaporator 174 is omitted from the unit 142.

At least one temperature sensor 171 may be disposed in the unit 142. The sensor 171 is in communication with the controller 48. Signals from the temperature sensor 171 may be used by the controller 48 to operate the coolant system 122, the refrigerant system 124, and the climate control system 126. For example, the controller 48 may utilize readings from the temperature sensor 171 to control the compressor 136 and the blower 154 to increase or decrease the temperature of the airstream as desired.

The thermal management system 120 may be operated in a plurality of modes such as a cabin-heating mode and a cabin-off mode. During both of these modes, the inverter 26 and the DC/DC converter 28 are cooled by the evaporator 80. In cabin-off mode, the valve 164 is closed to isolate the chamber 148 and the chamber 150 so that hot air is not circulated into the passenger cabin 112. The pump 128 and the compressor 136 are energized so that waste heat from the inverter 26 and the DC/DC converter 28 are rejected to the condenser 134. In this mode, the compressor 136 is operated based on inverter 26 and DC/DC converter 28 cooling needs. The blower 154 is energized to circulate an airstream through the condenser and out of the exterior vent 156.

In cabin-heating mode, waste heat from the inverter 26 and the DC/DC converter 28, which is boosted by the refrigerant system 124, is transferred to the airstream passing through the condenser 134. The valve 164 is at least partially open so that at least a portion of the hot airstream flows through the passageway 166 and into the second chamber 150. The temperature of the airstream exiting the condenser 134 may be reduced by actuating the valve 164, the valve 168, or both. The temperature of the airstream exiting the condenser 134 may be also be modulated by controlling the compressor 136 albeit as a slave to cooling requirements of the inverter 26 and the DC/DC converter.

Figure 4:
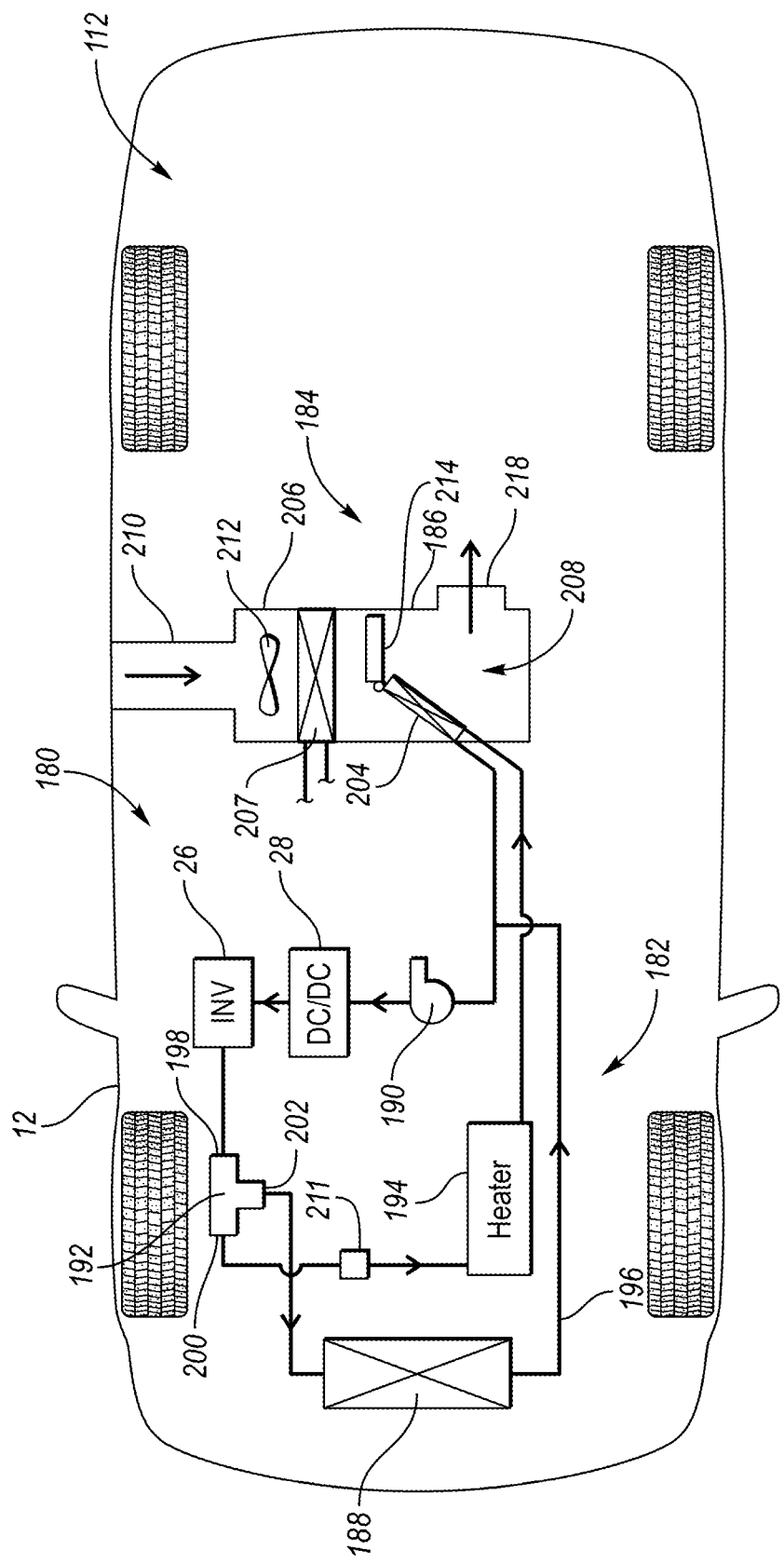
FIG. 4 is a schematic diagram of a thermal management system having a coolant system and a heater for boosting a temperature of coolant within the coolant system.

FIG. 4 illustrates a thermal management system 180 that utilizes a heater for boosting the waste heat as opposed to a refrigerant system. The thermal management system 180 includes a coolant system 182 and a climate control system 184. The coolant system 182 is configured to thermally regulate the inverter 26 and the DC/DC converter 28 and to provide waste heat to the climate control system 182 by circulating coolant to a HVAC unit 186 of the climate control system 184. The coolant system 182 may include a radiator 188, a pump 190, a valve 192, a heater 194, and conduit 196 arranged to circulate the coolant therethrough.

The coolant system 122 is also arranged to circulate coolant through a liquid-to-air heat exchanger (heater core) 204 that is disposed in the HVAC unit 186. The coolant system 182 may begin at the pump 190 which is connected to the DC/DC converter 28 by a first conduit. The DC/DC converter 28 is connected to the inverter 26 by a second conduit. The valve 192 is located downstream of the inverter 26. The valve 192 may be a three-way valve that includes an inlet 198 connected to the inverter 26, a first outlet 200 that is connected with the heater 194, and a second outlet 202 that is connected to the radiator 188. The heater 194 is connected to the heater core 204, which in turn is connected with the pump 190 to complete the fluid circuit.

The heater 194 may be an electric-resistance heater such as a positive temperature coefficient (PTC) heater. The heater 194 may be powered by the traction battery 24 or by a low-voltage auxiliary battery such as a 12 or 24-volt (V) battery. Many electric vehicles utilize a PTC heater as the sole heat source for the passenger cabin. These PTC heaters typically require high voltages and are powered by the high-voltage bus as opposed to a low-voltage source, e.g., the 12 V auxiliary battery. The high-power PTC heaters typically require a large amount of electrical power, which reduces vehicle range. In this disclosure, however, the heater 194 is merely a booster for the inverter 26 and DC/DC converter 28. As such, a lower voltage heater may be utilized in some applications to extend the electric range. In others, the heater 194 may be powered by the high-voltage bus. Other types of heaters may also be used.

The amount of heat boosting is dependent upon cabin-heating requirements and the design of the heater core 204. In one embodiment, the heater core 204 is designed to receive a 90 degrees Celsius coolant in order to provide high heat. Depending on operating conditions, the inverter 26 and the DC/DC converter 28 may only heat the coolant to 70 degrees Celsius, in which case, the heater 194 is operated to boost the coolant temperate by 20 degrees Celsius. These temperatures are merely illustrative and are not limiting. The coolant system 182 may include a temperature sensor 211 disposed downstream of the inverter 26 and DC/DC converter 28 and upstream of the heater 194. The temperature sensor 211 is configured to sense a temperature of the coolant circulating therethrough, and output a signal indicative of the coolant temperature to the controller 48. The controller 48 may operate the heater 194 based on signals from the temperature sensor 211.

The valve 192 may be electronically controlled and include a mechanism actuatable to proportion coolant between the outlets 200 and 202. The valve 192 may include a first position in which all the coolant is circulated to the outlet 200 and a second position in which all the coolant is circulated to the outlet 202. The valve 192 may further include intermediate positions in which coolant flow is proportioned between the outlets. The valve 192 may be in electronic communication with the controller 48 and operate according to instructions from the controller 48. In an alternative embodiment, the three-way valve 192 may be replaced with a pair of valves, which may be on-off valves as opposed to the above-described proportioning valve.

The HVAC unit 186 may include a housing 206 defining an interior 208. The heater core 204 is disposed within the interior 208 and is configured to receive a fresh airstream from a fresh air inlet 210. The blower 212 is disposed upstream of the heater core 204 and circulates air through the HVAC unit 186. The HVAC unit 186 includes at least one cabin vent 218 that provides air into the passenger cabin 112. An evaporator 207 of the vehicle air-conditioning system may be disposed in the HVAC unit 186 upstream of the heater core 204 as is traditionally done. Alternatively, the air-conditioning system may have a separate housing. A valve 214, such as a blend door, controls air flow through the heater core 204 to control the temperature of the air exiting the cabin vent 218. The valve may be optional as the valve 192 and the heater 194 can be actuated to control the temperature of the heater core 204.

Similar to operation of thermal management system 50, the controller 48 may actuate the valve 192 between various positions depending upon an operating mode of the thermal management system 180. The valve 192 may be actuated to the first position when in the cabin-heating mode so that the heat from the inverter 26 and the DC/DC converter 28 are circulated to the heater 194 and the heater core 204 rather than the radiator 188. The pump 190 is energized to circulate warm coolant from the inverter 26 and the DC/DC converter 28 to the heater 194, which boosts the coolant temperature prior to circulating to the heater core 204 if needed. The heater core 204 transfers thermal energy from the coolant to the airstream to cool the coolant for recirculation to the inverter 26 and the DC/DC converter 28 while simultaneously warming the airstream to provide heat to the cabin 112. The blower 212 is energized to draw the outside airstream through the heater core 204.

When in cabin-off mode, the valve 192 is actuated to the second position to cool the DC/DC converter 28 and the inverter 26 with the radiator 188. When the valve 192 is in the second position, coolant is circulated to the radiator loop to bypass the heater core 204.

Figure 5:
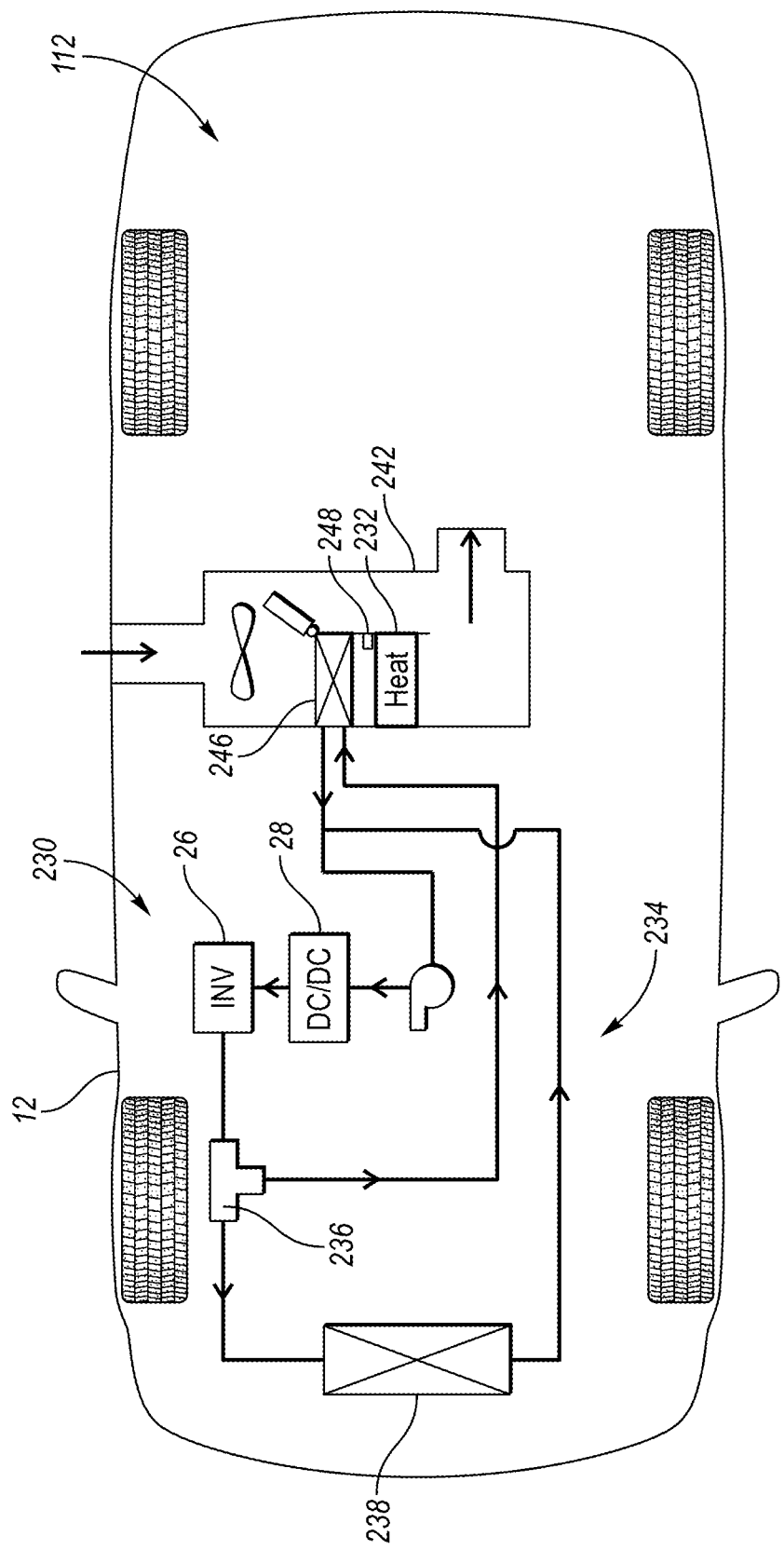
FIG. 5 is a schematic diagram of a thermal management system having a heater disposed in a climate control system.

FIG. 5 illustrates another thermal management system 230 that is similar to the embodiment of FIG. 4 but heats the air with a heater 232 rather than heating the coolant. The thermal management system 230 includes a coolant system 234 that has a valve 236 configured to circulate coolant to the radiator 238 when the valve 236 is in a first position and to circulate coolant to an HVAC unit 242 of the climate control system 234 when in a second position. A heater core 246 is in fluid communication with the coolant system 234 is disposed within an interior of the HVAC unit 242. The heater 232 is disposed downstream of the heater core 246 to boost a temperature of the airstream after passing through the heater core 246 if needed. The heater 232 may be electronically controlled by the controller 48 and is energized by the controller 48 when the heater core 246 is incapable of heating the airstream to a desired temperature. A temperature sensor 248 may be disposed within the HVAC unit 242 downstream of the heater core 246 and upstream of the heater 232. The temperature sensor 248 is in electronic communication with the controller 48 and is configured to output a signal indicative of the airstream temperature exiting the heater core. The controller 48 may operate the heater 232 based on signals from the sensor 248. For example, if the airstream temperature is less than the desired airstream temperature as sensed by the sensor 248, the controller 48 may energize the heater 232 to boost the temperature of the airstream to the desired temperature.

Figure 6:
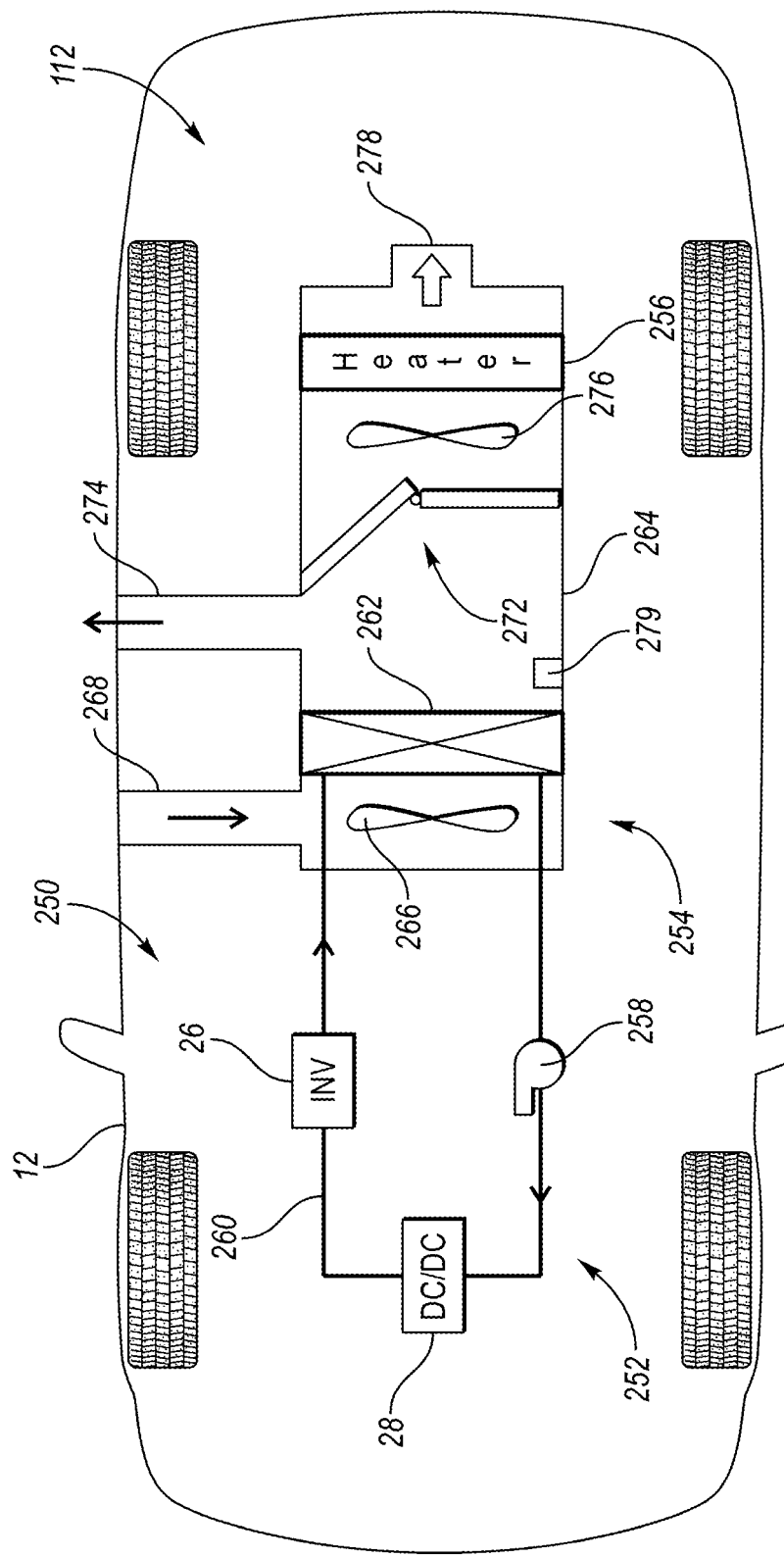
FIG. 6 is a schematic diagram of another thermal management system having a heater disposed in a climate control system.

Referring to FIG. 6, a thermal management system 250 includes a coolant system 252, a heater 256 (heat booster), and a climate control system 254. Similar to FIG. 3, the thermal management system 250 does not include a radiator for cooling the inverter 26 and the DC/DC converter 28, and instead circulates the waste heat to the HVAC unit 264 of the climate control system 254 to release the waste heat to the outside air, circulate the waste heat into the passenger cabin 112, or a combination of both. The coolant system 252 includes a pump 258 and conduit 260 arranged to circulate coolant through the DC/DC converter 28, the inverter 26, and a liquid-to-air heat exchanger (heater core) 262 that is disposed within the HVAC unit 264.

The climate control system 254 is responsible for heating and/or cooling the passenger cabin 112 and thermally regulating the inverter 26 and DC/DC converter 28. The HVAC unit 264 includes a blower 266 that draws air from a fresh-air inlet 268 to circulate an airstream through the heater core 262 to transfer thermal energy from the coolant to the airstream. The speed of the blower 266 can be increased or decreased depending upon the cooling needs of the inverter 26 and the DC/DC converter 28. The now-heated airstream may be circulated to an exterior vent 274 when cabin heat is not requested or can be circulated to the cabin 112 when heat is requested. A valve 272, e.g., a blend door, controls the circulation of the airstream between the exterior vent 274 and at least one cabin vent 278. A second blower 276 may be disposed downstream of the valve 272 to supplement the first blower 266. While not illustrated, one or more additional fresh-air/recirculation inlets may be provided downstream of the valve 272. The air-conditioning system of the vehicle may be integrated with the HVAC unit 264 or may have a dedicated HVAC unit.

The heater 256 may be used to heat the air within the HVAC unit 264 (as shown) or may be integrated with the coolant system 252 to heat the coolant (similar to FIG. 4). In the illustrated embodiment, the heater 256 is disposed in the HVAC unit 264 downstream of the valve 272 and the second blower 276 (if present) to boost the temperature of the airstream when needed. The heater 256 may be similar to the heater 232 described above. The heater 256 is in electronic communication with the controller 48 and may be controlled to increase or decrease the temperature of the airstream circulating through the cabin vents 278 based on cabin heating demands. A temperature sensor 279 may be disposed between the heater core 262 and the heater 256 to determine a temperature of the airstream exiting the heater core 262. The controller is in communication with the sensor 279 and may control the heater 256 based on signals from the sensor 279. For example, if the desired air temperature is 26 degrees Celsius and the sensor 279 is reading 20 degrees Celsius, then the controller 48 may operate the heater 256 to boost the airstream by 6 degrees Celsius.

Control logic or functions performed by controller 48 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 48. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Any reference to "a controller" refers to one or more controllers.

Figure 7:
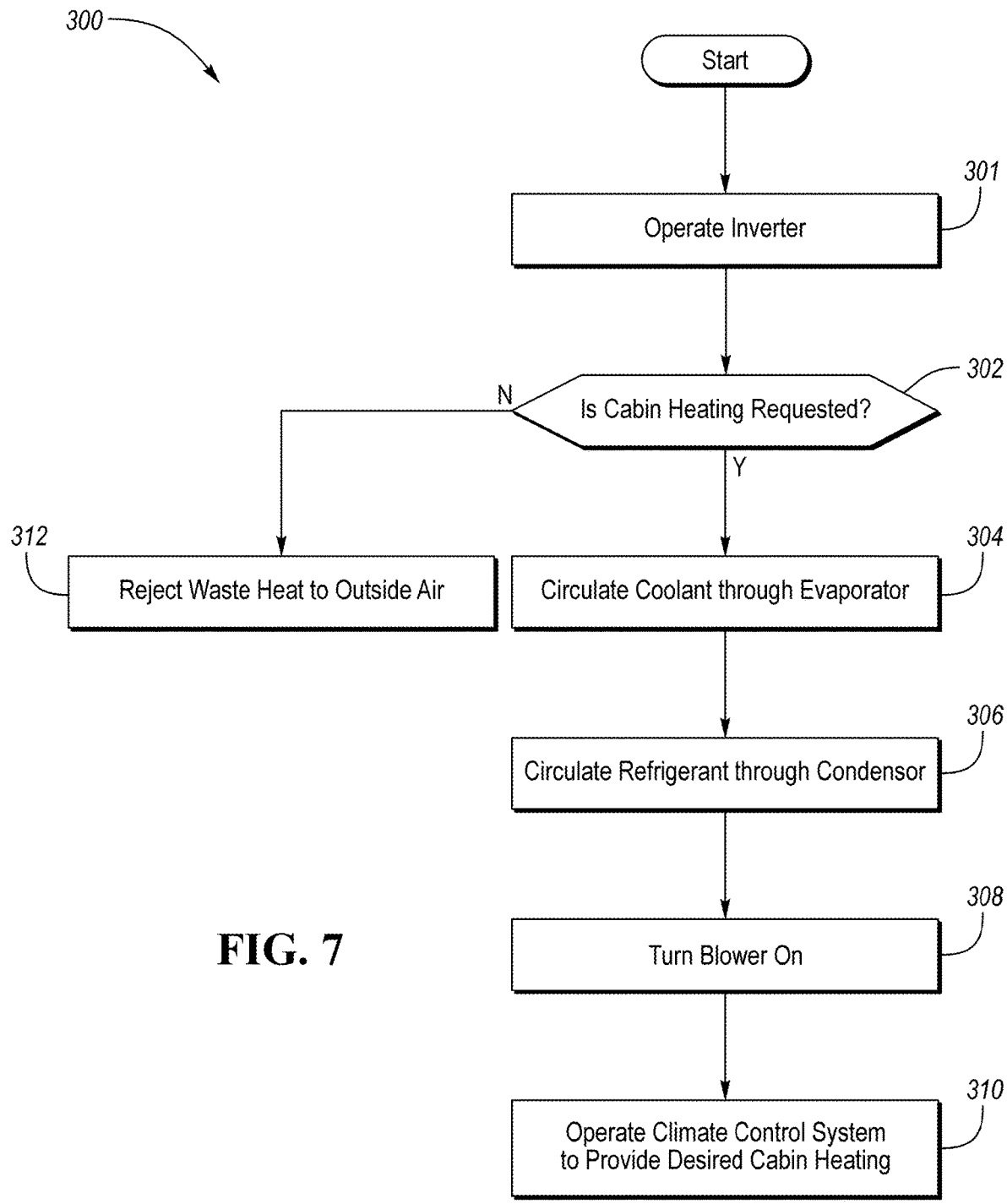
FIG. 7 is a flow chart illustrating an algorithm for controlling a thermal management system having a refrigerant system that supplements waste heat generated by at least an inverter.

FIG. 7 is a flowchart 300 of an algorithm for controlling a thermal management system having a refrigerant system that supplements the waste heat generated by the inverter and/or the DC/DC converter, such the embodiments of FIGS. 2 and 3.

At operation 301 at least the inverter is operated to generate waste heat. At operation 302 the controller determines if cabin heating is requested. If yes, control passes to operation 304 and coolant is circulated through the evaporator. Depending upon the design of the thermal management system, coolant may be circulated through the evaporator but merely energizing the pump, e.g., FIG. 3, or by energizing the pump and actuating at least one valve so that coolant is routed to the evaporator, e.g., FIG. 2.

At operation 306, the refrigerant system is activated to circulate refrigerant through the condenser. The refrigerant system may be activated by energizing the compressor and actuating the expansion device(s) (if applicable). The controller may operate the compressor based on cooling needs of the inverter and the DC/DC converter as well as cabin heating needs.

At operation 308, the blower within the HVAC unit is turned ON to circulate an airstream through the condenser. The climate control system is operated to provide the desired heating to the cabin at operation 310. This may include modulating the blower speed and/or operating one or more blend doors within the HVAC unit.

If cabin heating is not being requested at operation 302, control passes operation 312 and the thermal management system is operated to reject waste heat to the outside air. In FIG. 2 for example, the waste heat is rejected by a radiator. The controller may command one or more valves to route the coolant to the radiator rather than the evaporator at operation 312. In the illustrated embodiment of FIG. 3, the controller may operate a blend door within the HVAC unit to route the airstream to the external vent of the HVAC unit at operation 312.

Figure 8:
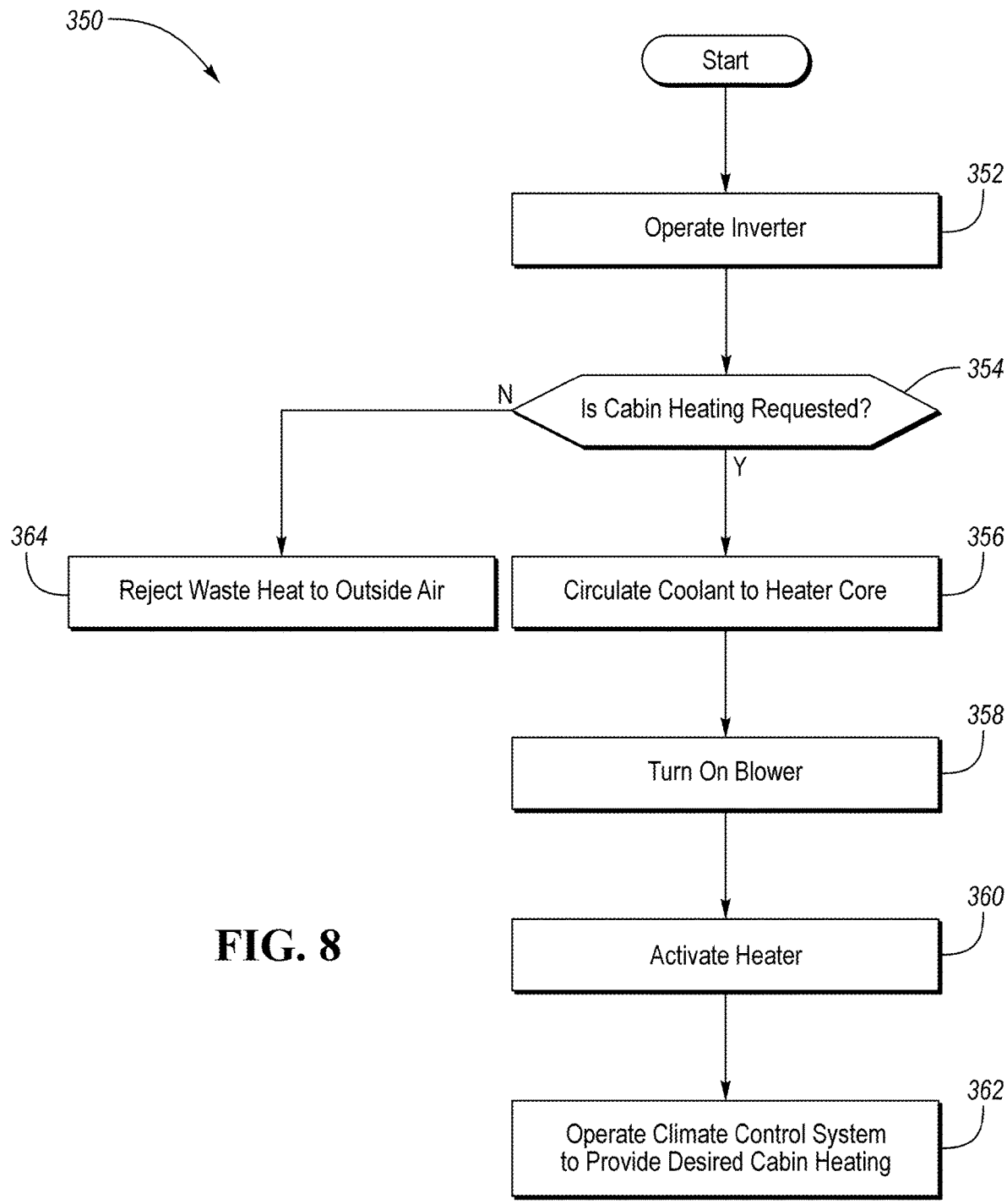
FIG. 8 is a flow chart illustrating an algorithm for controlling a thermal management system having an electric heater that supplements waste heat generated by at least an inverter.

FIG. 8 is a flowchart 350 of an algorithm for controlling a thermal management system having an electric heater that supplements the waste heat generated by the inverter and/or DC/DC converter, such as the embodiments of FIGS. 4, 5, and 6.

At operation 352 at least the inverter is operated to generate waste heat. At operation 354 the controller determines if cabin heating is requested. If yes, control passes to operation 356 and coolant is circulated through the heater core. Depending upon the design of the thermal management system, coolant may be circulated through the heater core by merely energizing the pump, e.g., FIG. 6, or by energizing the pump and actuating at least one valve so that coolant is routed to the heater, e.g., FIGS. 4 and 5. At operation 358, the blower within the HVAC unit is energized to circulate an airstream through the heater core. At operation 360, the heater is activated if the waste heat generated by at least the inverter is insufficient to provide the desired cabin heating. For example, in the embodiment of FIG. 4, the controller may monitor a temperature of the coolant exiting the inverter and if the coolant temperature is below a desired coolant temperature, the heater is activated to boost the temperature of the coolant circulating to the heater core. In the embodiment of FIG. 5, for example, the controller may monitor the temperature of the airstream exiting the heater core, and if the airstream temperature is less than the desired temperature, activate the heater to heat the airstream prior to entering the passenger cabin.

At operation 362 the climate control system is operated to provide the desired heating to the passenger cabin. For example, the controller may modulate the blower speed and/or actuate one or more blend doors within the HVAC unit to provide the desired air temperature at the desired cabin vents, e.g., floor, dash, defrost, etc.

If cabin heating is not being requested at operation 354, control passes operation 364 and the thermal management system is operated to reject waste heat to the outside air. In FIG. 4 for example, the waste heat is rejected by a radiator. The controller may command one or more valves of the coolant system to route the coolant to the radiator rather than the heater core at operation 364. In the illustrated embodiment of FIG. 6, the controller may operate a blend door within the HVAC unit to route the airstream to the external vent at operation 364.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
a heating ventilation and air conditioning (HVAC) unit including:
a housing defining an air inlet, a cabin vent, and an exterior vent that vents air outside of the vehicle,
a blend door disposed downstream the exterior vent and upstream the cabin vent, the blend door including a first position in which the air inlet and the cabin vent are in fluid communication and a second position in which the air inlet and the cabin vent are not in fluid communication,
a heater core disposed within the housing between the air inlet and the blend door, and
an electric heater disposed within the housing downstream of the blend door; and
a coolant system including conduit arranged to circulate coolant through the inverter and the heater core.
2. The vehicle of claim 1, wherein the HVAC unit further includes a first blower disposed within the housing upstream of the heater core and a second blower disposed within the housing downstream of the blend door.

3. The vehicle of claim 1, wherein the coolant system is valveless.

4. The vehicle of claim 1 further comprising a controller programmed to, in response to cabin heating not being requested, actuate the blend door to the second position.

5. The vehicle of claim 1 further comprising:
   a temperature sensor disposed within in housing downstream of the heater core and upstream of the electric heater, the sensor being configured to output a signal indicative of an air temperature; and
   a controller programmed to:
      in response to cabin heating being requested, actuate the blend door to the first position, and
      in response to the air temperature being below a desired temperature, energize the electric heater.

* * * * *